United States Patent
Misawa

(10) Patent No.: US 7,848,572 B2
(45) Date of Patent: Dec. 7, 2010

(54) IMAGE PROCESSING APPARATUS, IMAGE PROCESSING METHOD, COMPUTER PROGRAM

(75) Inventor: Reiji Misawa, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 11/379,225

(22) Filed: Apr. 19, 2006

(65) Prior Publication Data

US 2006/0239556 A1    Oct. 26, 2006

(30) Foreign Application Priority Data

Apr. 22, 2005  (JP)  ............................... 2005-124984

(51) Int. Cl.
*G06K 9/34* (2006.01)
(52) U.S. Cl. .................. 382/176; 382/164; 382/165; 382/173; 382/177; 382/180
(58) Field of Classification Search .............. 382/164, 382/165, 173, 176, 177, 180
See application file for complete search history.

(56) References Cited

U.S. PATENT DOCUMENTS

| 5,696,842 | A  | * | 12/1997 | Shirasawa et al. | ............ 382/176 |
| 5,892,843 | A  | * | 4/1999  | Zhou et al.      | .................. 382/176 |
| 6,738,496 | B1 | * | 5/2004  | Van Hall         | ..................... 382/101 |
| 2002/0037100 | A1 |  | 3/2002 | Toda | |
| 2004/0042659 | A1 | * | 3/2004 | Guo et al. | ................... 382/176 |

FOREIGN PATENT DOCUMENTS

| JP | 10-260993 A | 9/1998 |
| JP | 2002-077633 A | 3/2002 |
| JP | 2003-346083 A | 12/2003 |
| JP | 2004-128880 A | 4/2004 |

* cited by examiner

*Primary Examiner*—Vikkram Bali
*Assistant Examiner*—Daniel Zeilberger
(74) *Attorney, Agent, or Firm*—Canon U.S.A. Inc., I.P. Division

(57) ABSTRACT

An image processing method according to the present invention includes extracting from a document image an area to be determined, calculating the number of closed loops within the extracted area, and making a determination based on the calculated number of closed loops, whether the area is a character area. This invention makes it possible to determine with a high accuracy whether an area to be determined is a character area.

12 Claims, 14 Drawing Sheets

FIG.12
NumLoop=1  1205
NumLoop=1  1206
NumLoop=2  1207
NumLoop=2  1208
NumLoop=37 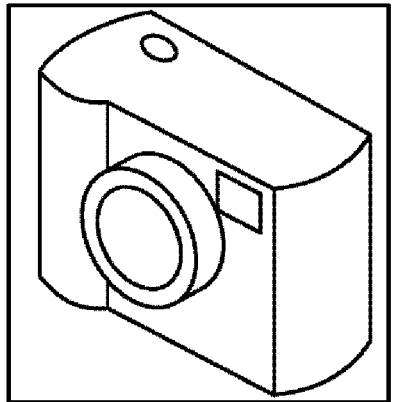 1209

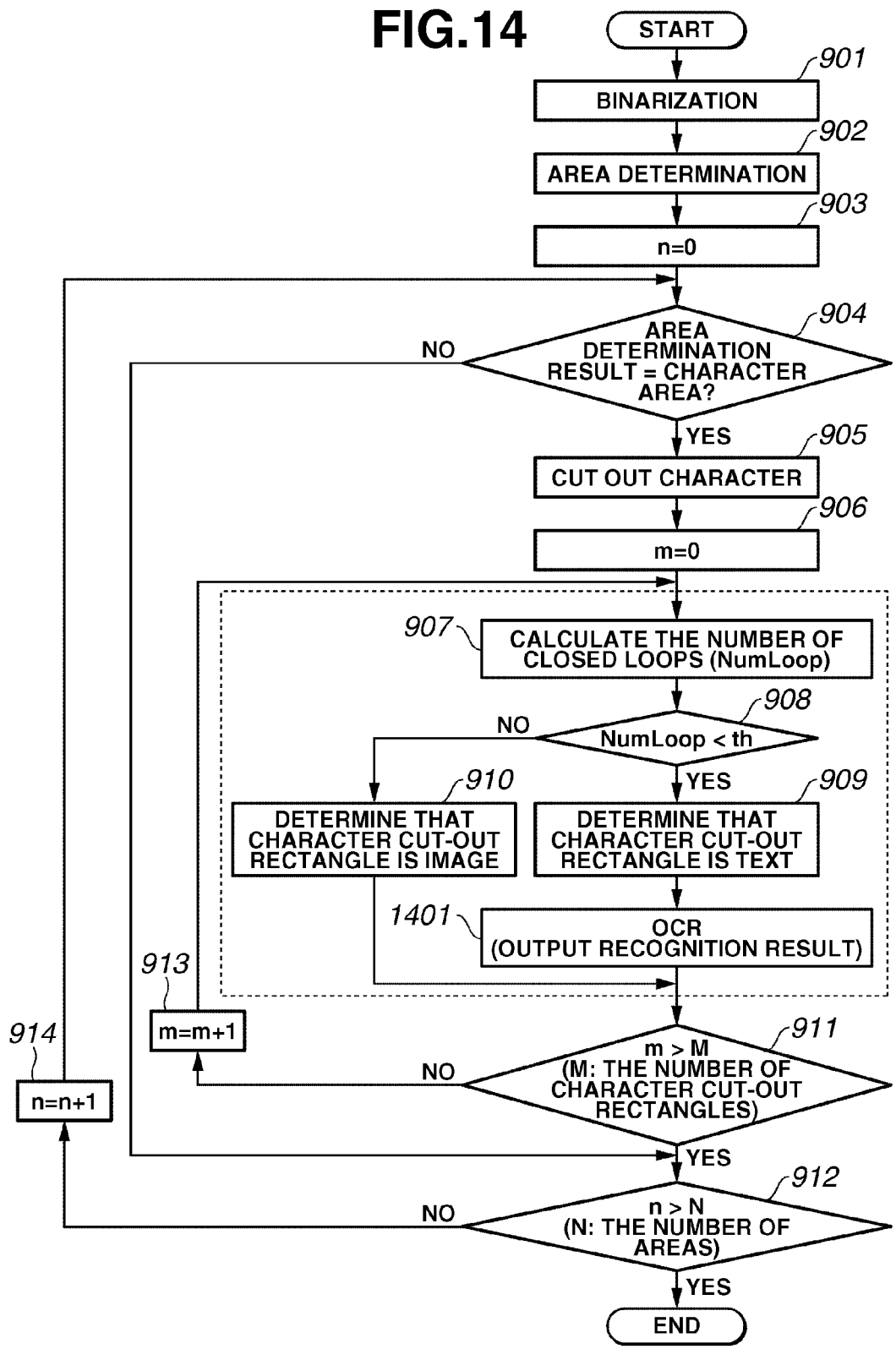

IMAGE PROCESSING APPARATUS, IMAGE PROCESSING METHOD, COMPUTER PROGRAM

BACKGROUND OF THE INVENTION

1. Field of the Invention

The invention relates to an image processing apparatus, an image processing method, and a computer program.

2. Description of the Related Art

Along with the widespread use of color printers, color scanners, etc., color documents are now ubiquitous. This has increased chances that color documents are captured by a scanner and stored as electronic files, or color documents are transmitted to third parties via the Internet or the like. However, handling full-color data places a heavy load on memory and transmission lines. Accordingly, it is necessary to make an amount of data smaller using methods such as compression processing.

The conventional methods for compressing color images include, for example, compressing data into pseudo-gradation binarized images through error diffusion or the like, compressing data through a JPEG (Joint Photographic Experts Group) technique, and converting data into 8-bit palette color to compress the data into a ZIP or LZW file. In addition, there are compression methods (e.g., Japanese Patent Application Laid-Open Nos. 2002-077633 and 2004-128880) that assure high quality images in ordinary character areas by combining lossless compression and lossy compression. Lossless compression is accomplished by a combination of area determination, MMR binary compression, and ZIP, whereas lossy compression is accomplished by JPEG.

Conventional technology for processing document images includes, for example, the technology for Optical Character Recognition (OCR) (e.g., Japanese Patent Application Laid-Open No. 2003-346083), which optically inputs documents, recognizes the characters on the documents, and outputs the corresponding text codes.

The OCR cuts out (extracts) lines of characters by density projection (histogram), then cuts out (extracts) each line of characters into character blocks, each block comprising one character. More specifically, when the character block is cut out, characters are subjected to density projection in the direction of the lines of characters, the lines of characters are separated according to variations in density projection value, then each line of characters is subjected to density projection in the direction perpendicular to the line of characters. Thus, each character block is extracted. In addition, the final character block, which is a character image serving as a character unit, is cut out, if necessary, using estimations of character pitches and standard character sizes or using information such as the value of density projection perpendicular to each line of characters. Each character block thus cut out is regulated in vertical and horizontal directions, and then undergoes the predetermined process of extracting specific character data. The degree of similarity between the character block and predetermined standard patterns is calculated for each character block whose character data has been extracted. As a result of this process of recognition, the character having the highest degree of similarity is determined. The collection of standard patterns is called a recognition dictionary.

Japanese Patent Application Laid-Open Nos. 2002-077633 and 2004-128880 discuss methods that assure high quality in ordinary character areas by combining lossless compression and lossy compression. The lossless compression is accomplished by a combination of area determination, MMR binary compression, and ZIP, whereas the lossy compression is accomplished by JPEG. However, the results of area determination according to the methods as described in these applications have a problem that an area which is not a character (e.g., photograph areas, hereinafter referred to as "non-character") is determined in error as a character area. This results in degradation in image quality.

Another problem of OCR processing is that, if an area that is cut out in the form of a character block, is a non-character area, a non-character is subjected to character recognition. In such a case, the entire processing speed decreases. Besides, a meaningless text code can be included in the output data as a result of the character recognition.

SUMMARY OF THE INVENTION

In view of the above problems in the conventional art, the present invention provides an image processing apparatus, image processing method, and computer program in which the attributes of characters and non-characters of extracted areas are satisfactorily determined.

According to an aspect of the present invention, an image processing apparatus includes: an area extracting unit configured to extract from a document image an area to be determined, a closed-loop calculating unit configured to calculate the number of closed-loops within the area to be determined that is extracted by the area extracting unit, and an area determining unit configured to determine whether the area to be determined is a character area based on the calculated number of closed loops.

According to another aspect of the present invention, an image processing method for controlling an image processing apparatus for processing a document image includes: extracting from a document image an area to be determined, calculating the number of closed loops within the area to be determined that is extracted; and determining whether the area to be determined is a character area based on the number of closed loops calculated.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 12 is another view for explaining the method of calculating the number of closed loops.

FIG. 14 is a flowchart illustrating area determination according to a fourth exemplary embodiment of the invention.

DETAILED DESCRIPTION OF THE EXEMPLARY EMBODIMENTS

Exemplary embodiments of the invention will be described in detail below with reference to the drawings.

First Exemplary Embodiment

In a first exemplary embodiment, an example is described in which an area determining technology of the present invention is applied to color image compression technology, which can be used in a color-copying machine. The color-copying machine incorporates a color copying function, a color printing function, and a color scanner function. The area determining technology according to the present exemplary embodiment, which will be discussed in this exemplary embodiment, can be used in the color copy function and the color scanner function. More specifically, the area determining technology can be applied to a compression technology used in compressing color image data captured by reading a color document. The color scanner function includes, for example, a data transmitting function and a storing function. Color image data captured by reading a color document is compressed and externally transmitted by the data transmitting function. Color image data is compressed and stored in a memory unit in a copying machine by the storing function.

Figure 1:
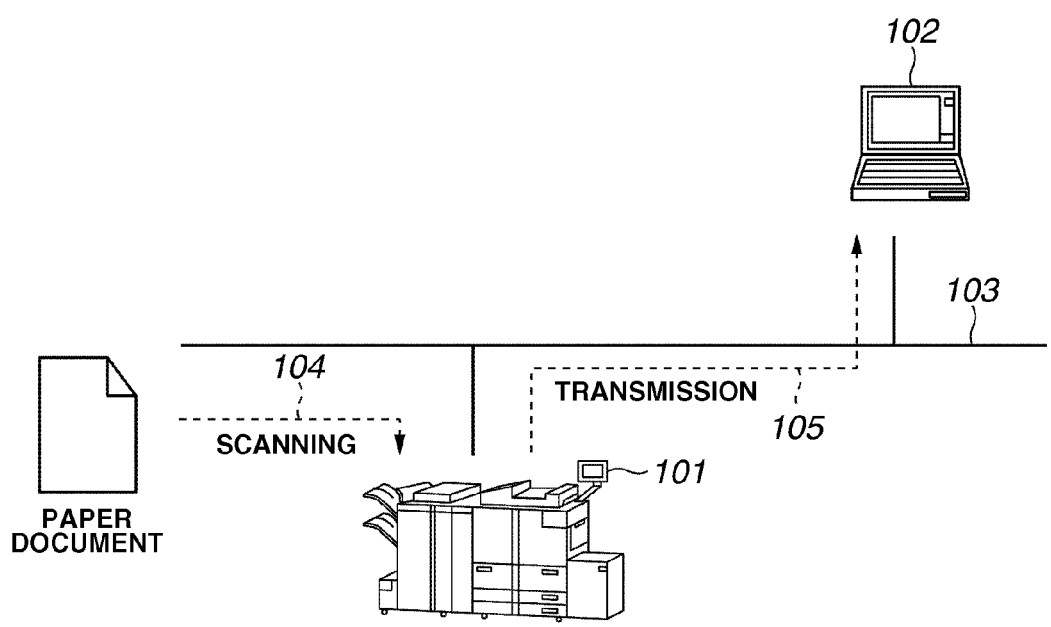
FIG. 1 illustrates a system according to a first exemplary embodiment of the present invention.

FIG. 1 is a diagram showing a system configuration according to the first exemplary embodiment. FIG. 1 illustrates an environment in which a complex machine (MFP: Multi Function Peripheral) 101 having a network communication function and a host computer (PC: Personal Computer) 102 are connected via a transmission medium, such as a network 103.

Dashed lines 104 and 105 show a flow of processing/controlling, which is described next. The dashed line 104 indicates the paper document reading process using a scanner of the MFP 101 operated by a user. A user specifies in advance a destination (e.g., PC 102) to which data will be transmitted, various transmission settings (e.g., resolution, compressibility), and a data format (e.g., JPEG (Joint Photographic Experts Group), TIFF (Tagged Image File Format), PDF (Portable Document Format), PDF high compression, PDF with the result of OCR (Optical Character Recognition)) via a user interface (203 in FIG. 2) of the MFP 101. In the first exemplary embodiment, since the area determining method for use in color image compression technology will be described, a case is taken where PDF high compression is specified as a data format. Detailed technical features of PDF high compressions will be described later. The dashed line 105 indicates processing in which, based on the specified transmission settings and data format, data is created using a software or hardware function (to be described later) of the MFP 101 and is transmitted to the specified destination. In this case, since the image is transmitted to the PC 102 in a file format such as PDF, the data can be seen with the general viewer of the PC 102.

Figure 2:
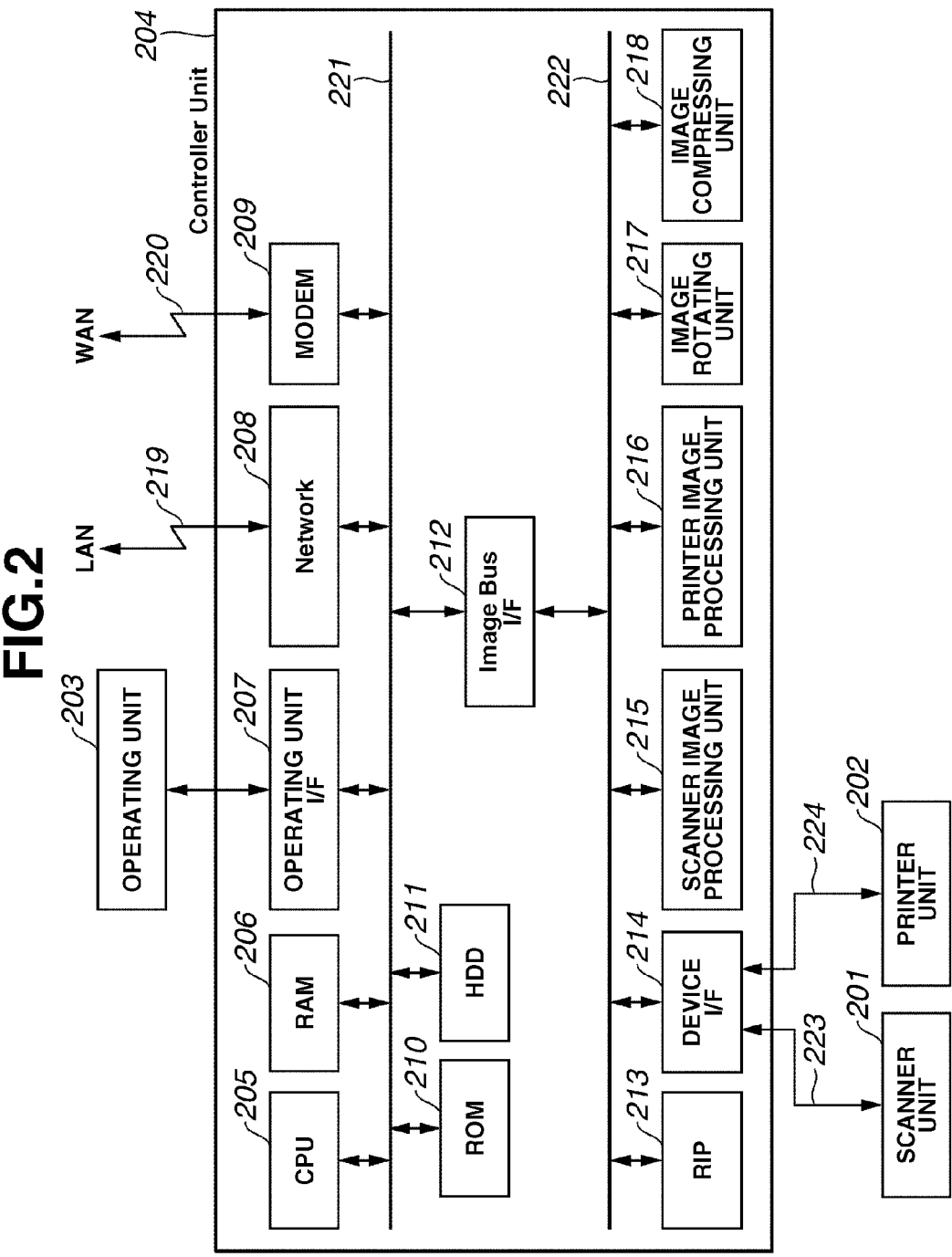
FIG. 2 is a block diagram showing the hardware configuration of a multi-function peripheral (MFP) according to the first exemplary embodiment of the present invention.

Next, the hardware configuration of the MFP 101 shown in FIG. 1 will be explained in detail with reference to FIG. 2.

The MFP 101 includes: a scanner unit 201 serving as an image input device; a printer unit 202 as an image output device; a controller unit 204 including CPU, a memory, etc; and an operating unit 203 serving as a user interface. The controller unit 204 is connected to the scanner unit 201, the printer unit 202, and the operating unit 203. The controller unit 204 is also connected to a LAN (Local Area Network) 219, or to a public line (WAN: Wide Area Network) 220 which is a general telephone line, and functions as a controller for inputting and outputting image information and device information. A CPU (Central Processing Unit) 205 is a controller for controlling the system. A RAM (Random Access Memory) 206 is a system work memory for the operation of the CPU 205, and is also an image memory for the temporary storage of image data. A ROM (Read-Only Memory) 210 is a boot ROM and stores the boot program for the system. An HDD 211 is a hard disk drive and stores the system control software and image data. A user interface I/F 207 interfaces with an operating unit 203 (and is also referred to herein as an operating unit I/F), and outputs image data for displaying in the operating unit 203. The user interface I/F 207 also transfers information that a user of the image processing apparatus has entered through the operating unit 203 to the CPU 205. A Network 208 connects the image processing apparatus to the LAN 219 and inputs/outputs packet system information. A Modem 209 connects the image processing apparatus to a public line 220, demodulates/modulates information, and inputs/outputs signals. The devices mentioned above are disposed on a system bus 221.

An Image Bus I/F 212 is a bus bridge for connecting the system bus 221 and the image bus 222 which transfers image data at a high speed and converts a data structure. For example, a PCI (Peripheral Component Interconnect) bus or an IEEE (Institute of Electrical and Electronics Engineers) 1394 bus is used as the image bus 222.

A Raster Image Processor (RIP) 213, a device I/F unit 214, a scanner image processing unit 215, a printer processing unit 216, an image rotating unit 217 and an image compressing unit 218 are disposed on the image bus 222. The RIP 213 analyzes PDL (Page Description Language) code and rasterizes it into a bitmap image. The device I/F unit 214 connects the scanner unit 201 serving as an image input/output device and the printer unit 202 to the control unit 204 via signal lines 223 and 224, respectively. The device I/F unit 214 performs conversion of a synchronous/asynchronous line for image data. The scanner image processing unit 215 corrects, processes, and edits input image data. The printer processing unit 216 subjects print output image data that should be transmitted to the printer unit 202, to correction, resolution-conversion, etc., in accordance with the printer unit 202. The image rotating unit 217 rotates and outputs received image data. The image compressing unit 218 performs a JPEG (Joint Photographic Experts Group) compression-decompression process for multi-level image data or a compression-decompression process specific to a device. The image compressing unit 218 also performs a JBIG (Joint Bi-level Image Experts Group), MMR (Modified Modified Read) or MH (Modified Huffman) compression-decompression process for binarized image data.

Figure 3:
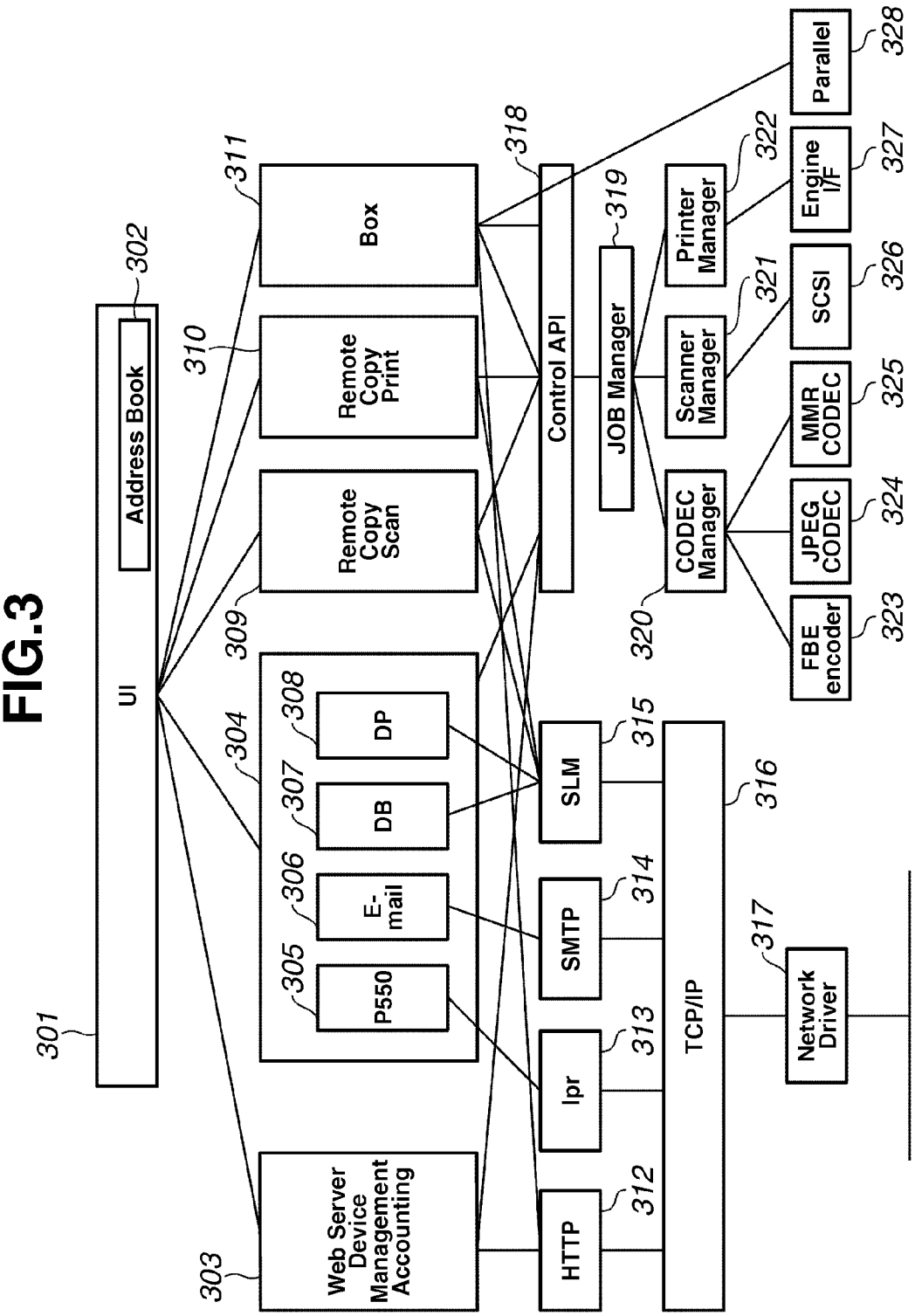
FIG. 3 is a block diagram showing the software configuration of the MFP according to the first exemplary embodiment of the present invention.

With reference to FIG. 3, the software configuration of the control unit 204 of FIG. 2 will now be explained. A User Interface (UI) 301 is a module for establishing communication between devices and user operations when an operator performs various operations or settings of the MFP through the operating unit 203. According to the operations performed by the operator, the module transmits input information to various modules (to be described later), requests a process, sets data, or the like.

An address book 302 is a database module for managing addresses to which data is transmitted or with which communication takes place. The address book 302 manages, for example, transfer information corresponding to the operations of the operating unit 203, the transfer information includes information of an address to which data is transmitted.

A Web-Server module 303 is used for transmitting management information of the MFP upon a request from a Web client (e.g., PC 102). The management information is read via a Universal-Send module 304, a Remote-Copy-Scan module 309, a Remote-Copy-Print module 310, and a control-API (Application Program Interface) 318 (all to be describe later). The management information thus read is transmitted to the Web client via an HTTP (Hyper Text Transfer Protocol) module 312 (to be described later), a TCP (Transmission Control Protocol)/IP (Internet Protocol) communication module 316 and a Network-Driver 317. The Web server module 303 creates information to be transferred to the Web client that is data in a so-called Web page (homepage) format such as an HTML (Hyper Text Markup Language) format. A Java, a CGI (Common Gateway Interface) program, or the like is used as required.

The Universal-Send module 304 controls data delivery so that data specified by an operator via the UI 301 is delivered to a specified destination of communication (output). In a case where creation of distribution data is instructed by an operator using the scanner function of the MFP, the scanner 201 of the MFP is operated via the control API 318, and the distribution data are created.

A P550 module 305 is executed when the printer is specified as the destination output in the Universal-Send module 304. An E-mail module 306 is executed when an E-mail address is specified as a communication address in the Universal-Send module 304. A DB module 307 is executed when a database is specified as an output destination in the Universal-Send module 304. A DP module 308 is executed when an MFP similar to the MFP is specified as an output destination in the Universal-Send module 304.

The Remote Copy Scan module 309 outputs the output destination of image information read by the scanner 201 using the scanner function of the MFP 101, to the printer of another MFP connected via a network or the like. Thus, the Remote Copy Scan module 309 carries out the processing identical to the copying function performed by the MFP alone. The Remote Copy Print module 310 prints out image information received from the scanner of another MFP connected via a network using the printer function of the MFP 101. Thus, the Remote Copy Print module 310 carries out the processing identical to the copying function performed by the MFP 101 alone. A Box module 311 performs a management function in which a scan image or a PDL print image is stored into an HDD and the stored image is printed by a printer function or transmitted by a Universal Send function and documents stored in the HDD are deleted, grouped (stored into individual boxes), transferred between BOXes, or copied between BOXes. The HTTP (Hyper Text Transfer Protocol) module 312 and the TCP/IP module 316 provide the Box module 311 with a communication function.

The HTTP module 312 is used when the MFP communicates using an HTTP. The HTTP module provides the Web server module 303 and a Web pull print (Box) module 311 with a communication function via the TCP/IP communication module 316 (to be described later). An lpr (line printer remote) module 313 provides the printer module 305 in the Universal-Send module 304 with a communication function via the TCP/IP communication module 316. An SMTP (Simple Mail Transfer Protocol) module 314 provides the E-mail module 306 in the Universal Send module 304 with a communication function using the TCP/IP communication module 316. An SLM (Salutation Manager Module) 315 provides the DB module 307 and DP module 308 in the Universal-Send module 304, the REMOTE COPY SCAN module 309, and the REMOTE COPY PRINT module 310 with a communication function using the TCP/IP communication module 316.

The TCP/IP communication module 316 provides the above-described various modules with a communication function using a network driver 317 (to be described later). The network driver 317 controls parts physically connected to the network.

The control API (Application Program Interface) 318 allows an upstream module, such as the Universal Send module 304, to interface with a downstream module, such as a Job Manager 319 (to be described later). The control API 318 reduces mutual dependence between the upstream and downstream modules, and improves the applicability of each module. A Job Manager 319 interprets processing instructed by the various modules via the control API 318 and gives instructions to various modules (to be described later). The Job Manager 319 consolidates and manages various jobs, including the control of FAX job, which are executed in the MFP.

A CODEC Manager 320 manages/controls compression/decompression of data among processings instructed by the Job Manager 319. An FBE encoder module (FBE Encoder) 323 compresses data read in a scanning process by the Job Manager 319 and a Scanner Manager 321 (to be described later) using an FBE format. A JPEG CODEC module 324 JPEG-compresses data read in a scanning process by the Job Manager 319 and the Scanner Manager 321 and JPEG-rasterizes print data in a printing process executed by the Printer Manager 322. An MMR (Modified Modified Read) CODEC module 325 MMR-compresses data read by a scanner in a scanning process executed by the Job Manager 319 and the Scanner Manager 321 and MMR-decompresses print data that is output to the printer in a printing process executed by the printer manager 322.

The Scanner Manager 321 manages/controls a scanning process based on instructions from the Job Manager 319. A SCSI (Small Computer System Interface) driver 326 establishes communication between the Scanner Manager 321 and the scanner unit 201 internally connected to the MFP. The Printer Manager 322 manages/controls a printing process based on instructions from the Job Manager 319. An Engine I/F 327 enables the Printer Manager 322 and the printer unit 202 to interface with each other. A Parallel Port Driver 328 enables the Web pull print module 311 (Box function) to interface with an output device (not shown) when the data is output to the output device via a parallel port.

Next, the Address Book 302 will be explained in detail. The Address Book 302 is stored in a nonvolatile storage device (e.g., nonvolatile memory or hard disk) in the MFP 101. In the Address Book 302, the characteristics of other devices connected to the network are written as listed below.

Names and alias of the devices
Network addresses of the devices
Network protocols which devices can process
Document formats which devices can process
Compression types which devices can process
Image resolution which devices can process
Information about the sizes of paper which can be fed to printer or about paper bins to be used
The names of folders in which server (i.e., computer) can store documents In each application which will be described below, the information described in the Address Book 302 makes it possible to determine the characteristics of a destination address.

By referring to the Address Book 302, the MFP 101 transmits data. For instance, a remote copy application determines from the Address Book 302 a resolution that can be processed by the device specified as a destination address, uses a known MMR in order to compress a binarized image read by the scanner, then uses a known TIFF (Tagged Image File Format) to format the compressed image, and transmits the formatted image to a printer device on a network through the SLM 315. The SLM 315 is a kind of network protocol incorporating device control information, etc., called Salutation Manager, which is well known. Therefore, detailed explanation of the SLM 315 is not provided here.

Figure 4:
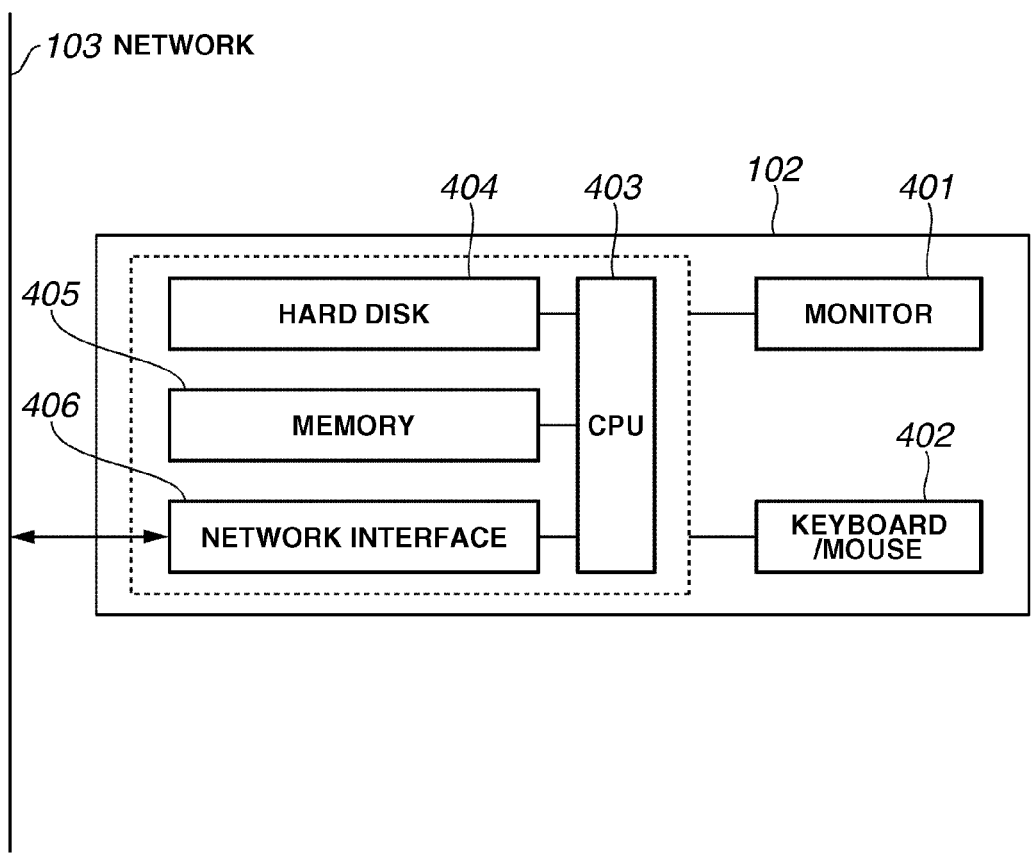
FIG. 4 is a block diagram showing the hardware configuration of a host computer (PC) according to the first exemplary embodiment of the present invention.

Next, with reference to FIG. 4, the hardware configuration of the host computer 102 will be described. The host computer 102 has the configuration and functions of a typical personal computer, and includes a monitor 401, keyboard and mouse 402 which are peripheral devices, a central processing unit (CPU) 403 which controls the host computer 102, and a hard disk 404 and a memory 405 which store applications and data. In addition, the host computer is connected to a transmission medium, such as the network 103, via a network interface 406.

The aforementioned PDF high compression will now be explained with reference to FIGS. 5 and 6.

The PDF high compression discussed here refers to color image compression technology, or a compression method involving determining an area, and performing compression by suitably selecting binary compression by MMR or lossy compression by JPEG according to the attribute of each area. The PDF high compression increases a compression rate and assures high quality in a character area.

Figure 5:
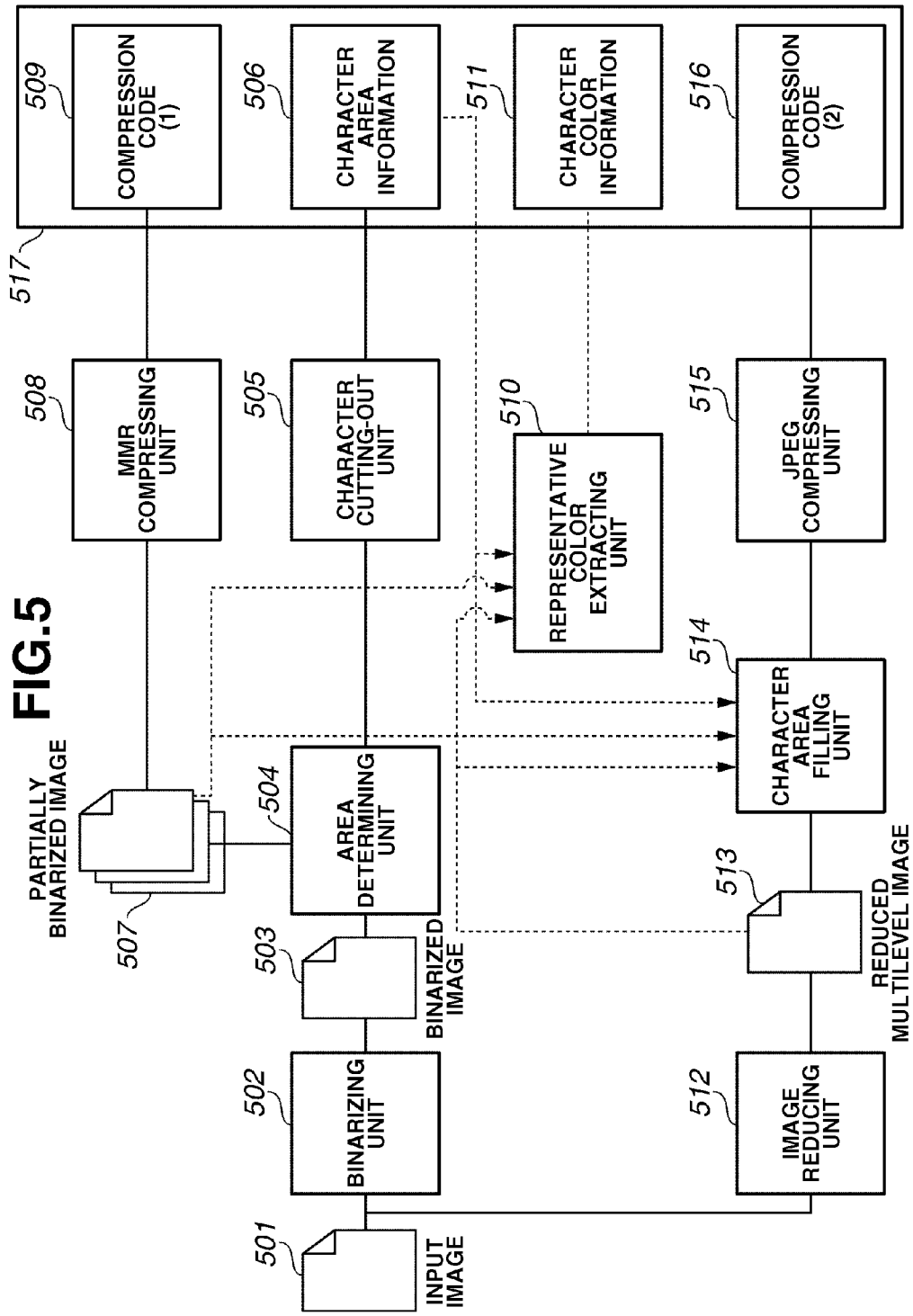
FIG. 5 is a block diagram showing an image compressing device.

In FIG. 5, an input image 501 which is a multi-level image is binarized in a binarizing unit 502 to form a binarized image 503. An area determining unit 504 obtains the binarized image 503 as input, and captures pixel clusters by tracing contours of predetermined pixels (e.g., black pixels) or the like, and groups the pixel clusters based on the sizes or positions of the pixel clusters, to divide the binarized image into areas. The area determining unit 504 then determines character areas based on the sizes and arrangements of the pixel clusters in the areas, and creates character area information. The character area information represents the position and the size of each character area. While the character areas are determined, the area determining unit 504 determines picture areas which constitute natural (gradation) images such as photograph, illustration and background. A character cutting out unit 505 cuts out each character as character cut out rectangles (unit character areas) from each area determined as a character area by the area determining unit 504 and creates character cut out rectangle information. The character cut out rectangle information represents the position and size of each character cut out rectangle. The character area information and character cut out rectangle information are managed as character area information 506. The binarized image 503 is input and each area determined to be the character area by the area determining unit 504 is processed so that a partially binarized image 507 is created that is a binarized image for each character area.

On the other hand, the input image 501 is reduced to low resolution by an image reducing unit 512 so that a reduced multi-level image 513 is formed. A representative color extracting unit 510 obtains as input the partially binarized image 507, calculates the representative color of each character cut out rectangle with reference to the character area information 506 and the reduced multi-level image 513, and treats the result as the character color information 511 (refer to Japanese Patent Application Laid Open No. 2004-128880 for details about this process). A character area filling unit 514 obtains as input the reduced multi-level image 513. With reference to the character area information 506 or partially binarized image 507, the character area filling unit 514 performs a process in which each character area or character cut out rectangle of the reduced multi-level image 513 is colored with its surrounding color (refer to Japanese Patent Application Laid Open No. 2002-077633 for details about this process).

After the processes described above is completed, each partially binarized image 507 is compressed as a Compression code (1) 509 by an MMR compressing unit 508. The filled multi-level image obtained by the character area filling unit 514 in the filling operation is compressed as a compression code (2) 516 by a JPEG compressing unit 515.

Thus, compression data 517 is created. The compression data is a combination of data groups such as the character area information 506, compression code (1) 509, character color information 511, and compression code (2) 516 which are captured from the components. The compressed data 517 is further subjected to lossless compression using PDF or the like, and thus PDF high compression data is created.

Figure 6:
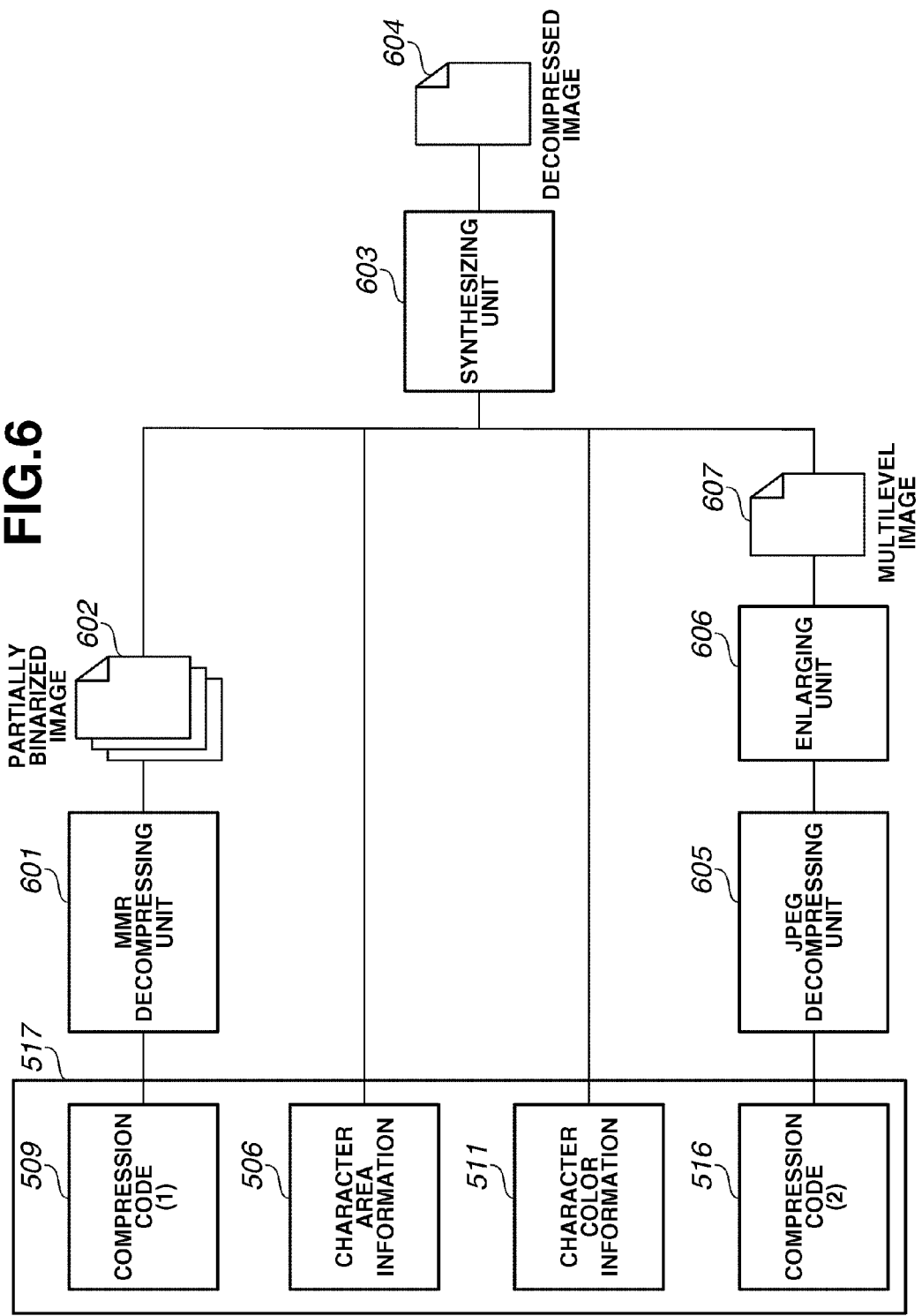
FIG. 6 is a block diagram showing an image decompressing device.

FIG. 6 shows a configuration for decompressing the compression data 517 created in a manner as described above. The MMR decompressing unit 601 obtains as input the compression code (1) 509 and performs an MMR decompressing process to form a partially binarized image 602. A JPEG decompressing unit 605 obtains as input the compression code (2) 516 and performs a JPEG decompressing process. The image is then subjected to an enlarging process in an enlarging unit 606 and a multi-level image 607 is created. While referring to the character area information 506, a synthesizing unit 603 allots pieces of the character color information 511 to the black pixels of the partially binarized image 602, and performs a synthesizing process. In the synthesizing process, the partially binarized image to which its character color has been allotted is overlaid onto the multi-level image 607 and displayed. In this case, transparent color is allotted to the white pixels of the partially binarized image 602 and transmits the multi-level image 607.

Thus, the image decompressing device decompresses the compression data created by an image compressing device, so that a decompressed image 604 which is the original image returns.

Figure 7:
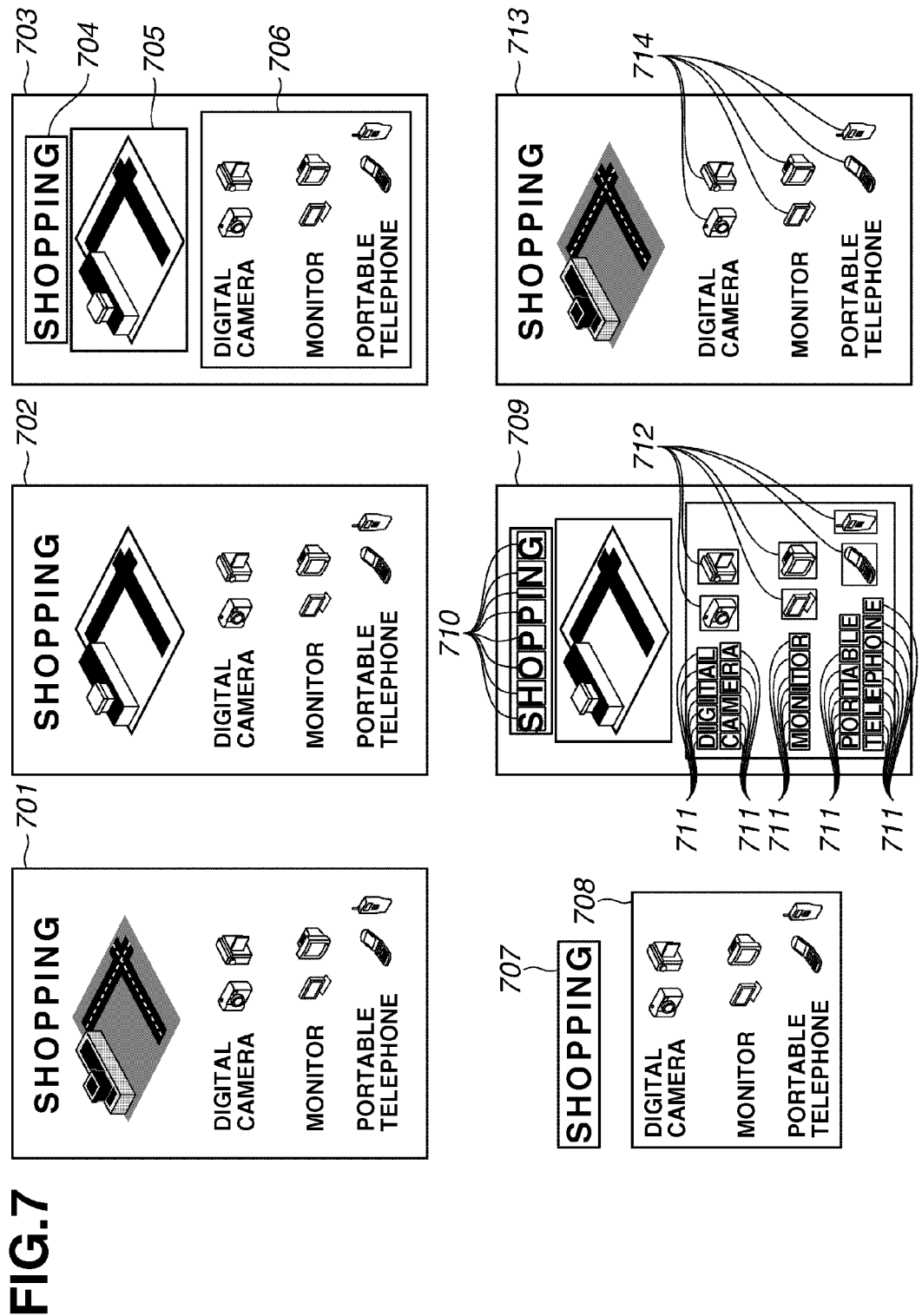
FIG. 7 shows samples of an input images and output images.

FIG. 7 is a view showing images used or created by the processes shown in FIGS. 5 and 6.

Drawing 701 shows the input image 501. Drawing 702 shows the binarized image 503.

Drawing 703 shows areas determined to be character areas and a photograph area, as a result of a determination made by the area determining unit 504. Here, drawing 704 and 706 show areas determined to be character areas whereas drawing 705 shows an area determined as a photograph area.

Drawings 707 and 708 show partially binarized images 507 of the area determined to be a character area by the area determining unit 504.

Drawing 709 is a view showing character cut out rectangles into which the area is cut out by the character cutting out unit 505. Drawing 710 shows the character cut out rectangles of the character area 704 while drawings 711 and 712 show character cut out rectangles of the character area 706. As shown in drawings 711 and 712, there may be a case where the character cut out rectangle in the character area includes a mixture of characters and photographs. For example, as described in Japanese Patent Application Laid Open No. 2002-077633, if pixel clusters are grouped depending on whether their positions are close to one another or whether their sizes are the same, a photograph area whose size is approximate to a character size may be mixed into a character area. If all the rectangles are treated as characters, the rectangles, as shown in drawing 712, that should be treated as photographs are processed as binarized images, with the result that the information is incomplete. Drawing 713 shows compression data 517, or PDF high compression data, which is created if all the character cut out rectangles in the character areas are processed as characters. As is clear from drawing 714, each photograph area having its original gradation and color is regarded as a character area and translated into binary data. This results in incompleteness of information.

Figure 8:
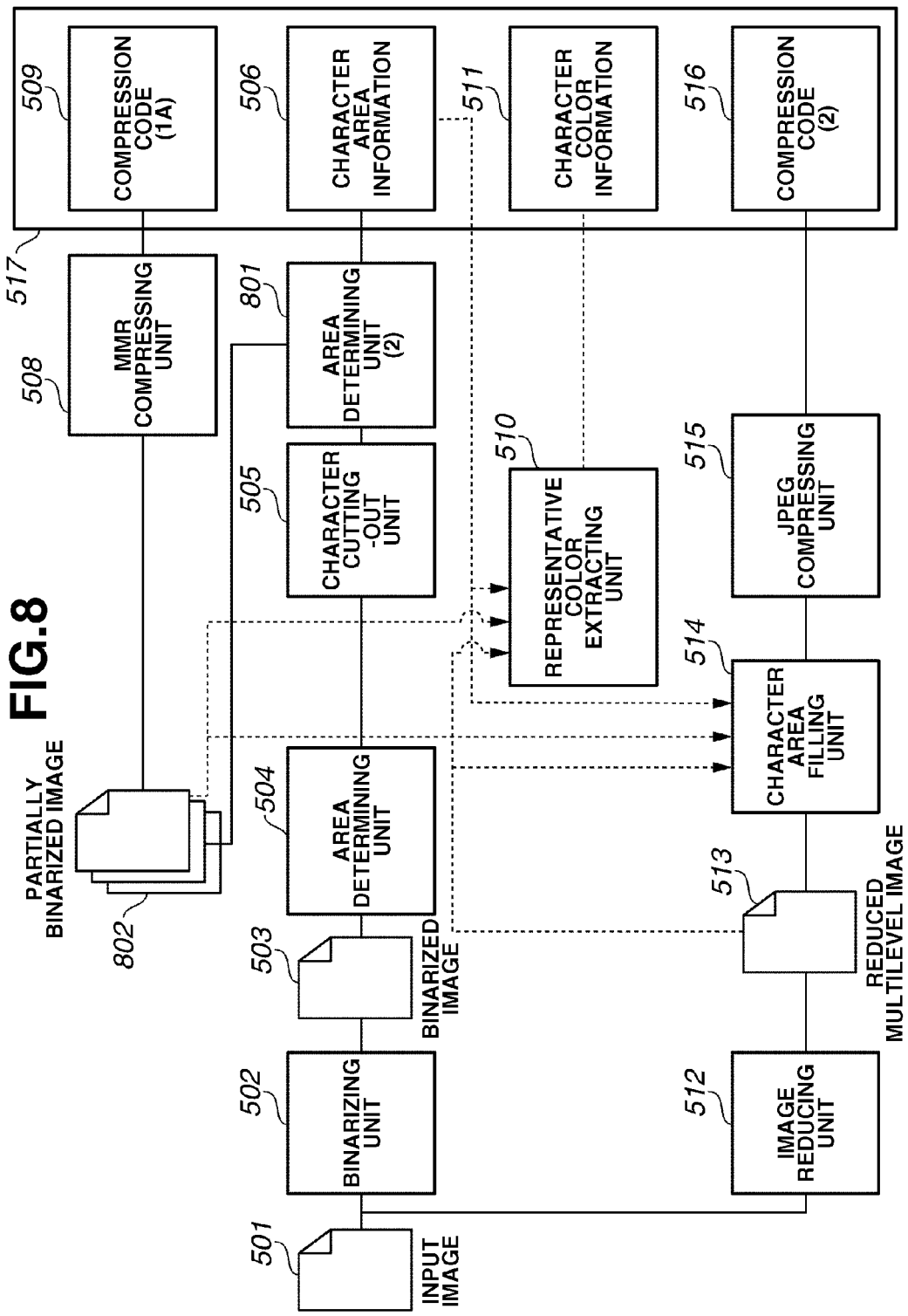
FIG. 8 is a block diagram showing an image compressing device according to the first exemplary embodiment of the present invention.

In order to overcome the problem, the present invention further includes an area determining unit (2) 801, as shown in FIG. 8, which performs area determination about character cut out rectangles. The other elements of the configuration are identical to those of FIG. 5.

Figure 9:
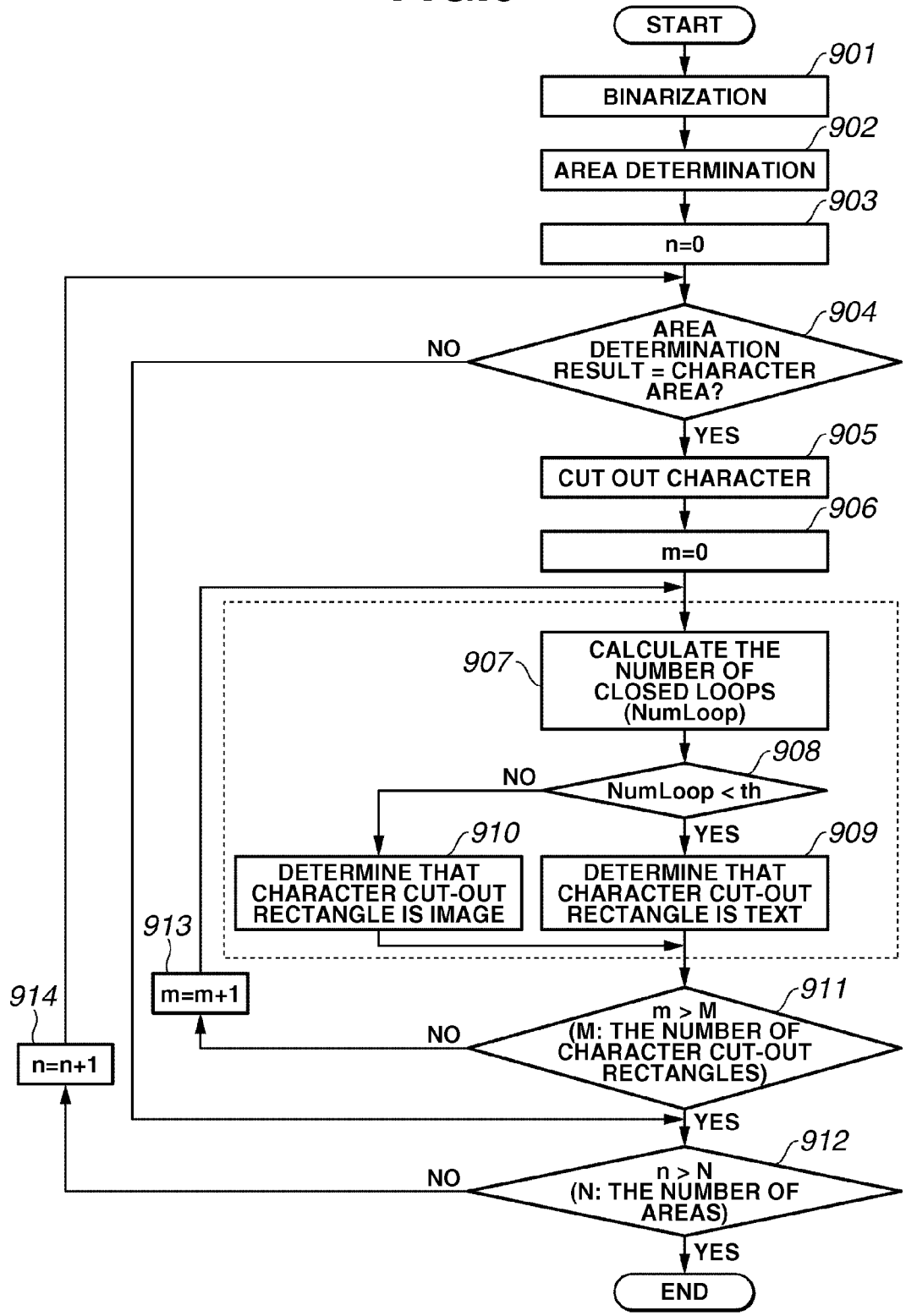
FIG. 9 is a flowchart illustrating area determination according to the first exemplary embodiment of the present invention.

Referring to the flowchart shown in FIG. 9, the area determining unit (2) 801 according to the first exemplary embodiment of the invention will now be explained. Here, since the flowchart in FIG. 9 shows a process performed in FIG. 8, FIG. 8 will be referred to, as necessary. The area determining unit (2) 801 performs the processes in steps 907 to 910 of FIG. 9.

Initially, in step 901, the input image 501 is binarized by a binarizing unit 502.

Next, in step 902, the binarized image 503 is subjected to area determination by the area determining unit 504. The area determination in step 902 is as follows: pixel clusters are captured, for example, by tracing the contour lines of the binarized images, and grouping pixel clusters located close to one another. As a result, separate characters or lines of characters are combined. Based on the sizes and positional relations of the grouped pixel clusters contained in the area, it is determined whether the area is a character area that contains one or a plurality of characters.

Subsequently, in step 903, a counter n, which is the number of areas, is set to 0. Next, in step 904, when the target area is determined as a character area, the process proceeds to step 905. When the area is determined as a non-character area, the process proceeds to step 912.

In step 905, the character cutting out unit 505 performs cutting out of characters. For example, lines of characters are cut out by acquiring a horizontal histogram, and then character rectangles are cut out by acquiring a vertical histogram.

In step 906, a counter m for the number of character cut out rectangles is set to 0. Next, in step 907, the area determining unit (2) 801 calculates the number of closed loops (NumLoop) in each character cut out rectangle. The number of closed loops is the number of contours of the black pixels or white pixels in each character cut out rectangle, which will be described in detail later. In step 908, the number of closed loops (NumLoop) and predetermined threshold th (e.g., threshold th=9) are compared (here, the threshold th can be a fixed value but may be also dynamically variable according to the size of each character cut out rectangle). If the number of closed loops (NumLoop) is less than the threshold, the character cut out rectangle is determined to be TEXT in step 909. If the number is not less than the threshold, the character cut out rectangle is determined to be IMAGE in step 910.

In step 911, the counter m for the number of character cut out rectangles and M for the number of character cut out rectangles in each character area are compared. If the comparison results in a determination that the processes 907 to 910 are finished for all character cut out rectangles, the flow proceeds to step 912. If the determination is made that there remains an unprocessed character cut out rectangle, the counter m is incremented in step 913 and the flow returns to step 907.

In step 912, the counter n for the number of areas and N for the number of areas are compared. If the comparison results in a determination that all the areas have been determined, the present routine terminates. If it is determined that there remains an unprocessed area, the counter n is incremented in step 914 and the flow returns to step 904.

Figure 10:
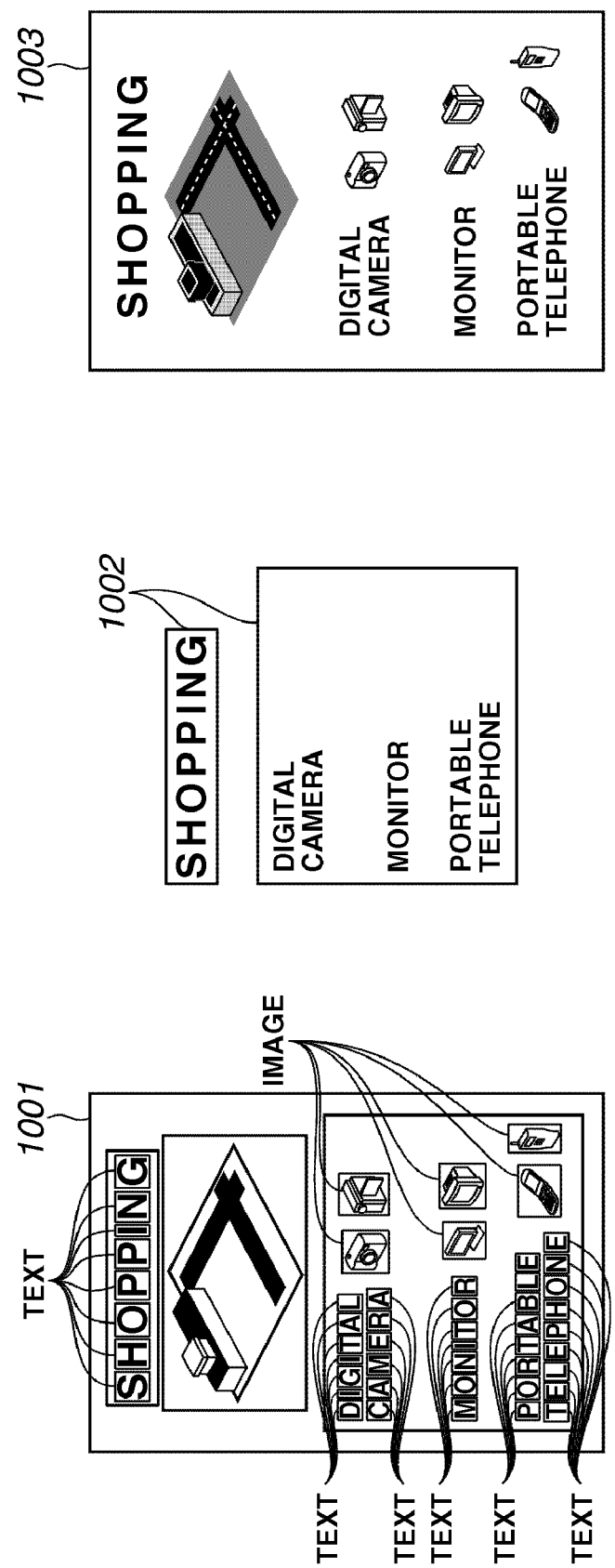
FIG. 10 is a view showing samples of an input image and output image according to the first exemplary embodiment of the present invention.

Thus, based on the number of closed loops, the area determining unit (2) 801 determines whether each of the character cut out rectangles in the character area is TEXT or IMAGE. Drawing 1001 in FIG. 10 shows the result of the determination about each character cut out rectangle obtained by the area determining unit (2) 8 in the case where the input image 507 is an image as shown in drawing 701. Partially binarized image 802 in FIG. 8 is formed using the character cut out rectangle area determined to be a character area and also determined to be TEXT by the area determining unit (2) 801. Drawing 1002 in FIG. 10 shows a diagram of the partially binarized image thus formed. If the area determining unit (2) 801 does not determine an area, the photograph area is binarized as shown in drawing 714 in FIG. 7. However, if the area determining process is performed by the area determining unit (2) 801, the created compression data 517 is highly accurate, and prevents a photograph area from being binarized, as shown in drawing 1003 in FIG. 10.

Next, a method for calculating the number of closed loops, as shown in step 907 in the flowchart, will be described referring to FIG. 11. The extraction of the contour lines from a binarized image begins from finding a tracing start point in order to trace each contour line of the binarized image. When the tracing start point is found, the contour is traced from the tracing start point. Tracing continues while finish marks are successively put on contour points that have been found. Each time the tracing finishes, one series of contour points (one contour line) is acquired. By repeating this procedure, all the contour lines in the image can be extracted. In this exemplary embodiment, the total of the contour lines in each character cut out rectangle is referred to as the number of closed loops (NumLoop).

Figure 11:
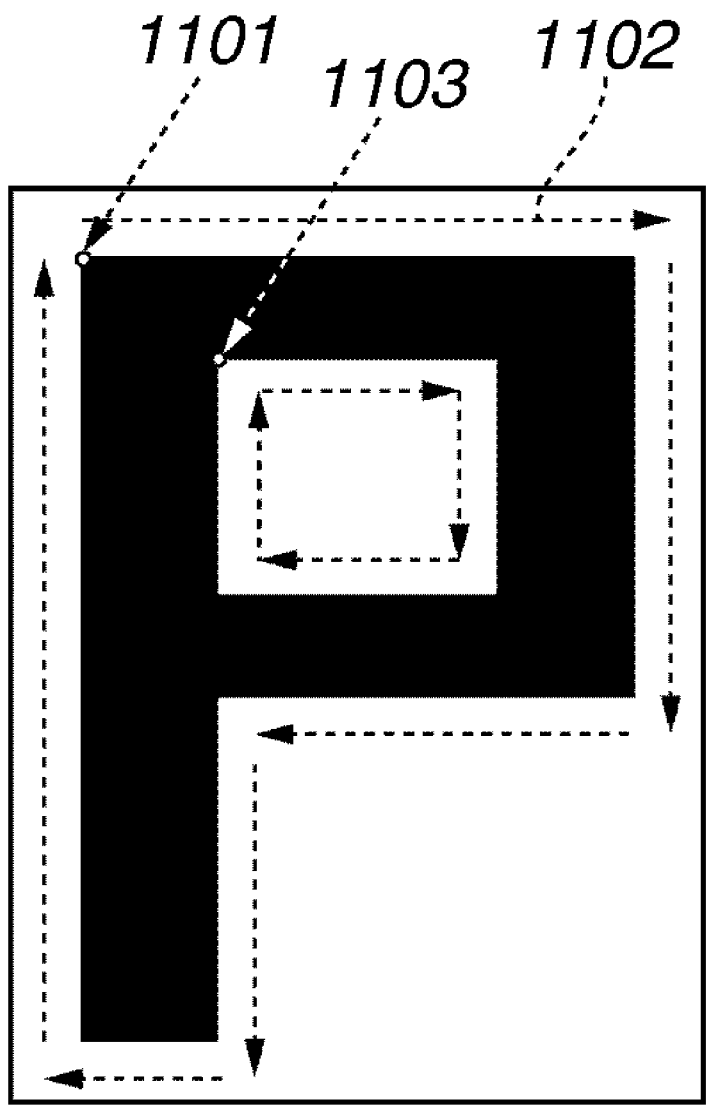
FIG. 11 is a view for explaining a method of calculating the number of closed loops.

FIG. 11 shows an example of a character cut out rectangle. First, a raster scan is carried out to find a point at which pixel color changes from white to black, and the point is used as a tracing start point 1101 for tracing a contour line. Next, the contour line is traced following the arrow 1102, indicated by broken lines. When the arrow 1102 returns to the tracing start point 1101, the number of closed loops is counted and becomes one. Then, another tracing start point 1103 is found and the process is performed again in the same manner. In FIG. 11, the number of closed loops counted is two.

Drawings 1205 to 1209 show exemplary character cut out rectangles together with the numbers (NumLoop) of closed loops corresponding to the rectangles. The numbers of closed loops of characters shown in drawings 1205 to 1208 are small (single digit). On the other hand, the number of closed loops in a photograph, as represented in drawing 1209, can be extremely large.

As described above, highly accurate area determination can be achieved by the area determining unit (2) 801. Based on the number of closed loops in each character cut out rectangle, the area determining unit (2) 801 determines whether the character cut out rectangle is a character or a photograph. Thus, the highly accurate area determination can be realized and compression data 517 or PDF high compression data having satisfactory image quality can be obtained.

Second Exemplary Embodiment

In the first exemplary embodiment, the case was described where, based on the number of closed loops of each character cut out rectangle, it is determined whether the rectangle is a character or a photograph. However, for example, a complex Chinese character tends to have a relatively large number of closed loops compared to more general characters such as the alphabet, or hiragana (Japanese syllabary characters). Conversely, there is also a photograph that has a number of closed loops as small as a number of closed loops in a complex Chinese character.

In the first exemplary embodiment, a determination is made using one threshold number th of closed loops. In the second exemplary embodiment, however, the threshold number of closed loops is divided into a plurality of steps, and characteristics other than the number of closed loops can be utilized, so that determination about a character cut out rectangle can be more adequately made. The area determining method according to the second exemplary embodiment will now be explained in detail. In the second exemplary embodiment, identical drawings and reference numbers are used in the description of processes which are similar to the first exemplary embodiment, and explanations of these are not repeated.

Referring to the flowchart of FIG. 13, the area determining method using a plurality of threshold numbers of closed loops will now be explained.

Figure 13:
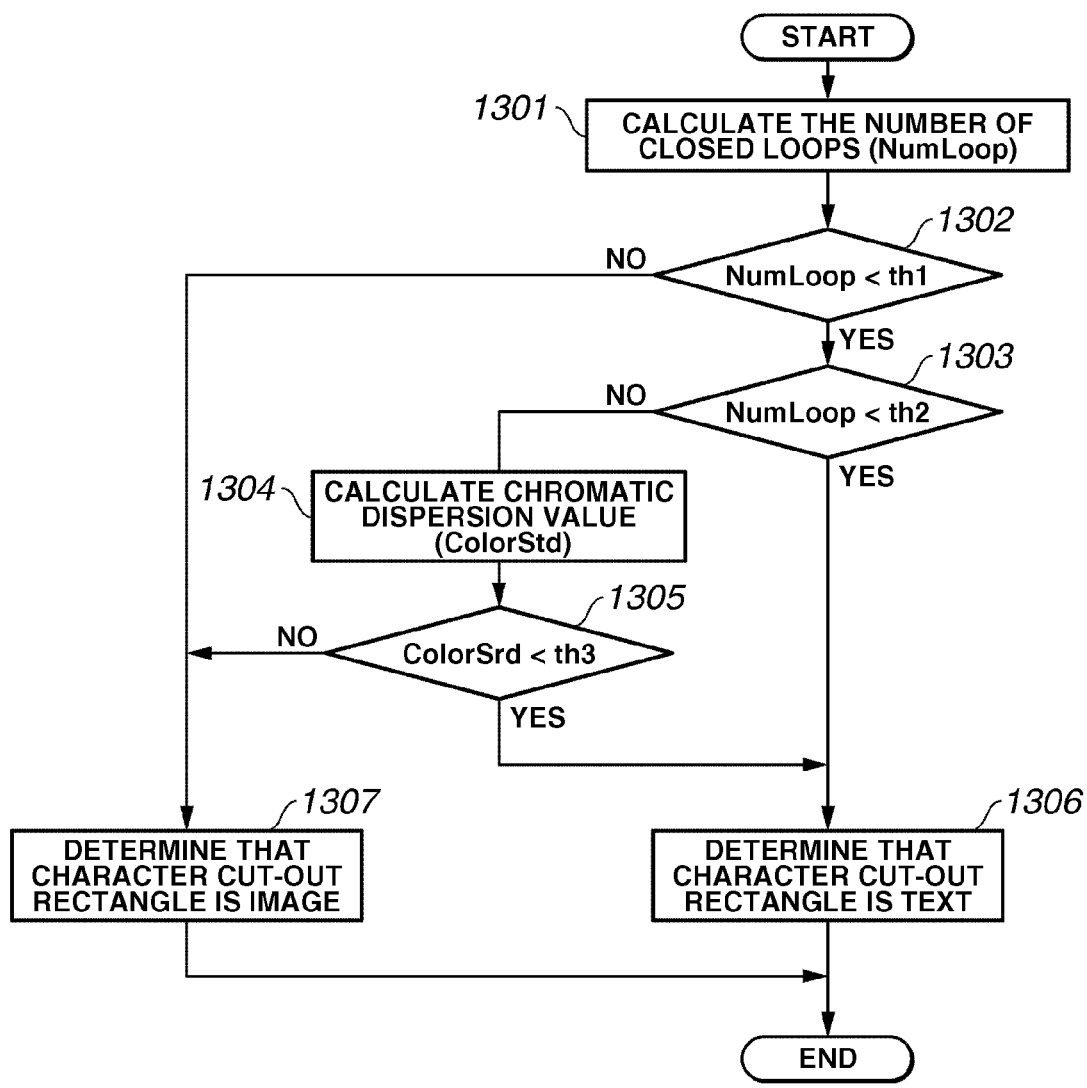
FIG. 13 is a flowchart illustrating area determination according to a second exemplary embodiment of the invention.

FIG. 13 is a flowchart showing the routine performed by the area determining unit (2) 801, which corresponds to the steps 907 to 910 of the flowchart in FIG. 9. Initially, in step 1031, the number of closed loops is calculated as described in the first exemplary embodiment. Subsequently, in step 1302, the actual number (NumLoop) of closed loops and the predetermined first threshold th1 is compared. If the number of closed loops (NumLoop) is less than a threshold th1, the routine proceeds to step 1303. If the number (NumLoop) is not less than the threshold th1, the routine proceeds to step 1307, where the area is determined to be IMAGE. In step 1303, the number of closed loops (NumLoop) and the predetermined second threshold th2 are compared. If the number of closed loops (NumLoop) is less than a threshold th2, the area is determined to be TEXT in step 1306. If the number (NumLoop) is not less than the threshold th2, a chromatic dispersion value (Color Std) is calculated in step 1304. A chromatic dispersion value calculating method will be described later. Subsequently, in step 1305, the chromatic dispersion value (Color Std) is compared with a predetermined threshold th3 of the chromatic dispersion value. If the chromatic dispersion value (Color Std) is less than the threshold th3, the area is determined to be TEXT in step 1306. If the chromatic dispersion value (Color Std) is not less than the threshold th3, the area is determined to be IMAGE in step 1307. After the character cut out type is determined (TEXT in step S1306 or IMAGE in step S1307), processing ends. Each of the thresholds may be a value that is found experimentally. For example, such values as th1=18, th2=6 can be used.

For example, when a complex Chinese character having a comparatively large number of closed loops or a photograph having a comparatively small number of closed loops has a value larger than the second threshold th2 and smaller than the first threshold th1, it is determined based on the color dispersion value. In this method, a characteristic of photograph is utilized that a typical multi-gradation photograph has a larger chromatic dispersion value than a typical monochrome (e.g. black) character. As a result, the complex Chinese character having a comparatively large number of closed loops or the photograph having a comparatively small number of closed loops can be satisfactorily determined based on the color dispersion value in step 1305.

Next, the aforementioned chromatic dispersion value calculating method is described. In order to acquire color information, the color of reduced multi-level image 513 (e.g., 8 bits of each of the RGB values) has to be referred to. Further, values (e.g., 8 bits of each of the YCbCr values) obtained by converting each of the RGB values into information about brightness and color differences can be referred to. Here, as an example, the chromatic dispersion value of the Cb value of the YCbCr value is calculated. Since the method for converting from RGB to YCbCr is well known, the explanation is not provided here.

As a chromatic dispersion value, a generally known variance is used that is obtained by the following formula:

$$\text{Variance(dispersion)} = \Sigma(Cb(i)-m)^2/n$$

n: the number of pieces of data (the number of black pixels in a character cut out rectangle), Cb(i): the Cb value of a reduced multi-level image that positionally corresponds to a black pixel in the character cut out rectangle, M (average): $\Sigma Cb(i)/n$ Thus, the threshold number of closed loops is divided into a plurality of steps and also the characteristics other than the number of closed loops are referred to according to each step. As a result, adequate area determination can be assured.

In the second exemplary embodiment, the chromatic dispersion value was used as the characteristics other than the number of closed loops. However, the characteristics are not limited to the chromatic dispersion. For example, information about the density of black pixels in the character cut out rectangle or information about isolated pixels in the rectangle can also be used as the characteristics.

Third Exemplary Embodiment

In the first exemplary embodiment, the case is described where the area determining method according to the present invention is employed in color image compression technology, which can be applied to a color copying machine. However, the applicable technology is not limited to the above. The present invention can also be applied to monochrome image compression technology used in a monochrome copying machine or color-copying machine. In the case of the monochrome image compression technology, the input image 501 in FIG. 5 has, for example, a gray scale (8 bits), and the binarized image 503 and the reduced multi-level image 513 are realized by combination of binary compression by MMR and lossy compression by JPEG.

Fourth Exemplary Embodiment

In the first to third exemplary embodiments, the case was described where the area determining method according to the present invention is used in image compression technology. In the fourth exemplary embodiment, a case is described where the area determining method is applied to optical character recognition (OCR) technology.

In general OCR processing, a line of characters is cut out (extracted) by subjecting a document image to density projection (acquiring a histogram). Each line of characters is further cut out (extracted) into character blocks, each block having one character. Then, character data is extracted from each character block, similarity between the character data and a standard pattern is calculated, and the character that has the highest similarity is output as the result of the recognition. As described above, if a character cut out rectangle which is a non-character is subjected to character recognition, the processing speed decreases and a meaningless text code may be output, leading to an undesirable result.

To overcome the problem, in the fourth exemplary embodiment, the area determining unit (2) 801 in FIG. 8 determines the area of the character cut out rectangle in advance before OCR processing so as to determine whether the character cut out rectangle is a character or a non-character. OCR processing is performed only when it is determined that the rectangle is a character, and therefore, the problem is solved. The processing is shown in the flowchart in FIG. 14. Processes in steps 901 to 914 in FIG. 14 are identical to steps 901 to 914 in FIG. 9 and their explanations are not repeated here. That is, up to character block cut out (extraction) processing, binarizing an image, determining an area, and cutting out each character are performed, as illustrated in FIG. 9 of the first exemplary embodiment. In step 908, the number of closed loops (NumLoop) and a predetermined threshold th are compared. If the number of closed loops is less than the threshold, the character cut out rectangle is determined to be TEXT in step 909. Consequently, the character cut out rectangle is subjected to OCR processing in step 1401 and the result of the character recognition is output. If the number of closed loops is not less than the threshold, the character cut out rectangle is determined to be IMAGE and, therefore, is not subjected to OCR processing.

Thus, when the OCR technology is used, OCR processing is performed only when necessary. Therefore, processing speed can be increased and output of meaningless text codes can be prevented.

Fifth Exemplary Embodiment

In the first exemplary embodiment, as shown in FIG. 8, the area determining unit 504 determines a character area including a plurality of characters, and the character cutting out unit 505 cuts out the character rectangle areas from the character area, and, based on the number of closed loops, the area determining unit (2) 801 determines whether each character rectangle area is a character. However, the flow of the processing is not limited thereto. For example, the determining of the character area by the area determining unit 504 may be omitted. Instead, the character cutting out unit 505 may directly cut out the character rectangle areas from the image 503, and, based on the number of closed loops of each character rectangle area, the area determining unit (2) 801 may determine whether the character rectangle area is a character.

Sixth Exemplary Embodiment

The present invention may be applied to a system that includes a plurality of devices (e.g., host computer, interface apparatus, reader, printer, etc.) or an apparatus that includes a single device (e.g., copying machine or facsimile machine).

It is to be understood that the aspects of the present invention can be implemented by supplying a system or device with a storage medium in which the program code (software) of the function according the exemplary embodiments described above is stored, and then allowing the computer (or CPU or micro-processing unit (MPU)) of the system or device to read and execute the program code stored in the storage medium. Examples of storage mediums for supplying the program code are a floppy disk, hard disk, optical disk, magneto-optical disk, compact disk-ROM (CD-ROM), CD-recordable (CD-R), magnetic tape, nonvolatile memory card, ROM, etc.

The above-described function according to the exemplary embodiments is implemented by executing the program code read by the computer. But it is to be understood that the function according to the exemplary embodiments can also be accomplished when part or all of the actual process is performed by an OS (operating system) on the computer based on the instructions of the program code.

Further, it is be understood that the function according to the exemplary embodiments can also be realized by writing the program code read from the storage medium, into the memory of a function expansion board inserted in a computer or into the memory of a function expansion unit connected to the computer, then allowing the CPU or the like of the function expansion board or function expansion unit to perform part or all of actual processing based on the instructions of the program code.

As has thus been described in the first to sixth exemplary embodiments, the present invention improves the accuracy of area determination. In addition, it is satisfactorily determined whether an area is a character or non-character. This ensures satisfactory image quality and improves compression efficiency. The present invention, if employed for determining a character area to be recognized in OCR technology, increases processing speed, and prevents output of a meaningless text code, thus improving recognition rate.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-124984 filed Apr. 22, 2005, which is hereby incorporated by reference herein in its entirety.

What is claimed is:

1. An image processing apparatus comprising:
   a processor;
   a memory, wherein the memory stores:
   an area extracting unit configured to extract from a document image an area to be determined;
   a closed-loop calculating unit configured to calculate a number of closed loops within the area to be determined that is extracted by the area extracting unit;
   a characteristics extracting unit configured to extract characteristics other than the number of closed loops from the area to be determined when the closed-loop calculating unit calculates that the number of closed loops is less than a first threshold and not less than a second threshold, wherein the first threshold is greater than the second threshold; and an area determining unit configured to determine a type of area of the area to be determined, wherein, when the number of closed loops calculated by the closed-loop calculating unit is not less than the first threshold, the area determining unit determines that the area to be determined is a photograph area, wherein, when the number of closed loops calculated by the closed-loop calculating unit is less than the second threshold, the area determining unit determines that the area to be determined is a character area, and wherein, when the number of closed loops calculated by the closed-loop calculating unit is less than the first threshold and not less than the second threshold, the characteristics extracting unit extracts the characteristics, and the area determining unit determines whether the area to be determined is a character area, based on the characteristics extracted by the characteristics extracting unit.

2. The image processing apparatus according to claim 1, wherein the memory further stores a preliminary determining unit configured to determine a character area candidate from the document image based on pixel clusters contained in the document image, wherein the area extracting unit is configured to extract as the area to be determined a character rectangle that is included in the character area candidate determined by the preliminary determining unit.

3. The image processing apparatus according to claim 1, wherein the memory further stores a binarizing unit configured to form a binarized image from a multi-level image, wherein the document image extracted by the area extracting unit is a binarized image formed by the binarizing unit.

4. The image processing apparatus according to claim 3, wherein the number of closed loops calculated by the closed-loop calculating unit is the number of contours of black pixels or white pixels within the area to be determined.

5. The image processing apparatus according to-claim 1, wherein the characteristics extracted by the characteristics extracting unit comprise a chromatic dispersion value of the area to be determined.

6. The image processing apparatus according to claim 1, wherein the memory further stores a compression unit configured to compress data of the document image such that if the area to be determined is determined to be a character area by the area determining unit, it is subjected to a first compression processing, and if the area to be determined is determined to be a non-character area by the area determining unit, it is subjected to a second compression processing.

7. The image processing apparatus according to claim 6, wherein the first compression processing is suitable for a binarized image and the second compression processing is suitable for a multi-level image.

8. The image processing apparatus according to claim 6, wherein the memory further stores a representative-color calculating unit configured to calculate a representative color from the area determined to be the character area by the area determining unit, wherein the compression data includes a first compression code acquired by the first compression processing, a second compression code acquired by the second compression processing and information about a representative color acquired by the representative-color calculating unit.

9. The image processing apparatus according to claim 6, wherein the image that is subjected to the second compression processing is a document image formed in such a manner that the area determined to be a character area of the document image is colored with surrounding color.

10. The image processing apparatus according to claim 1, wherein the memory further stores a character recognition processing unit configured to execute character recognition processing on the area determined to be the character area by the area determining unit.

11. An image processing method for controlling an image processing apparatus configured to process a document image, the image processing method comprising:

extracting, by a processor performing an area extracting unit of the image processing apparatus, from a document image an area to be determined;

calculating, by a processor performing a closed-loop calculating unit of the image processing apparatus, a number of closed loops within the area to be determined that is extracted;

extracting, by a processor performing a characteristic extracting unit of the image processing apparatus, characteristics other than the number of closed loops from the area to be determined when the closed loop calculating unit calculates that the number of closed loops is less than a firth threshold and not less than a second threshold, wherein the first threshold is greater than the second threshold; and determining, by a processor performing an area determining unit of the image processing apparatus, a type of area of the area to be determined, wherein, when the number of closed loops calculated by the closed-loop calculating unit is not less than the first threshold, the area determining unit determines that the area to be determined is a photograph area, wherein, when the number of closed loops calculated by the closed-loop calculating unit is less than the second threshold, the area determining unit determines that the area to be determined is a character area, and wherein, when the number of closed loops calculated by the closed-loop calculating unit is less than the first threshold and not less than the second threshold, the characteristics extracting unit extracts the characteristics, and the area determining unit determines whether the area to be determined is a character area, based on the characteristics extracted by the characteristics extracting unit.

12. A non-transitory computer-readable storage medium having stored thereon a computer program for controlling an image processing apparatus configured to process a document image, the computer program including computer-executable instructions for performing a method comprising:

extracting from a document image an area to be determined;

calculating the number of closed loops within the area to be determined that is extracted;

extracting characteristics other than the number of closed loops from the area to be determined when the number of closed loops calculated is less than a first threshold and not less than a second threshold, wherein the first threshold is greater than the second threshold; and determining a type of area of the area to be determined, wherein, when the number of closed loops calculated is not less than the first threshold, the area to be determined is determined to be a photograph area, wherein, when the number of closed loops calculated is less than the second threshold, the area to be determined is determined to be a character area, and wherein, when the number of closed loops calculated is less than the first threshold and not less than the second threshold, characteristics are extracted, and it is determined whether the area to be determined is a character area, based on the characteristics extracted.

* * * * *